Patented Sept. 29, 1931

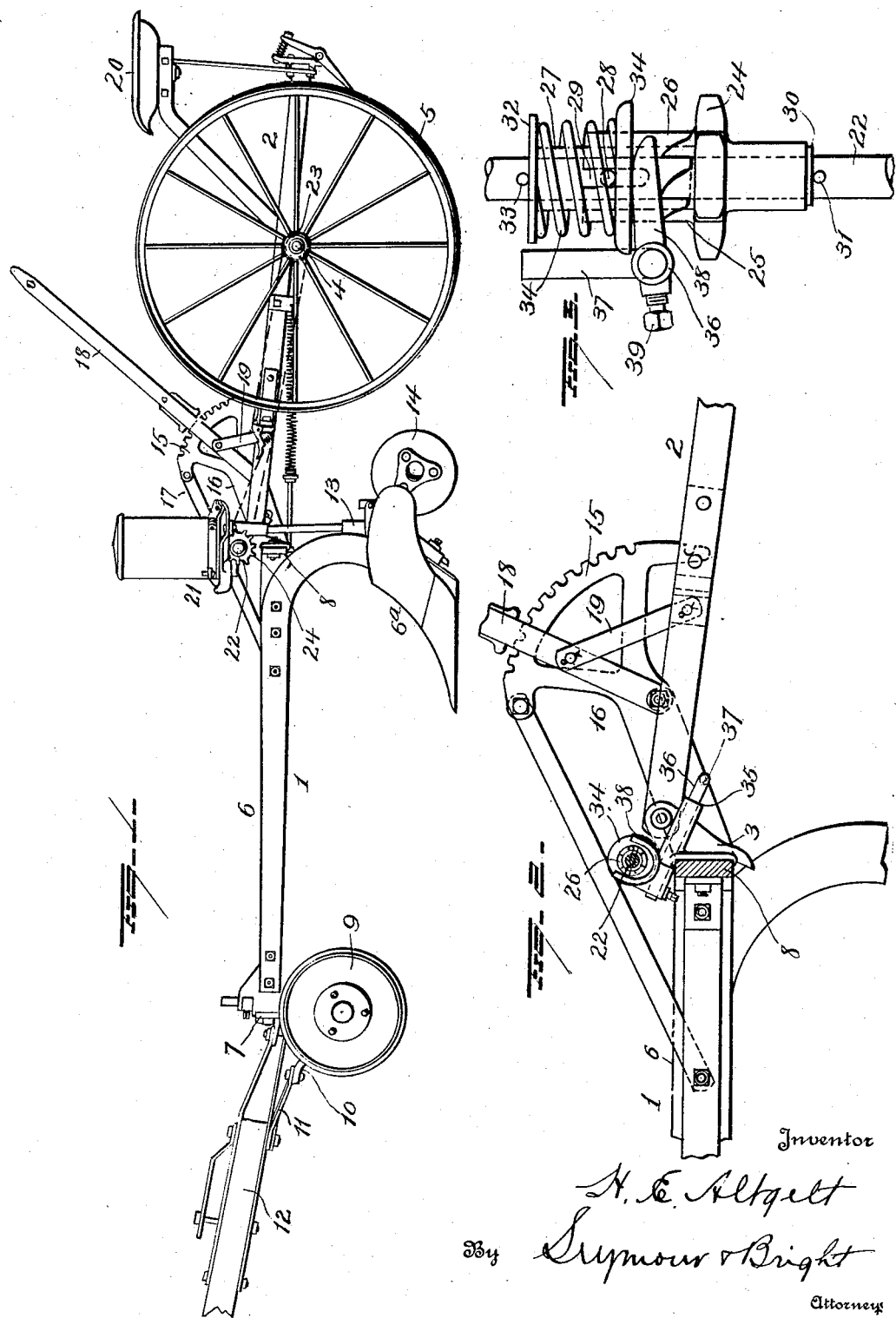

1,824,976

UNITED STATES PATENT OFFICE

HERMAN E. ALTGELT, OF SOUTH BEND, INDIANA, ASSIGNOR, BY MESNE ASSIGNMENTS, TO OLIVER FARM EQUIPMENT COMPANY, A CORPORATION OF DELAWARE

AGRICULTURAL IMPLEMENT

Application filed August 8, 1927. Serial No. 211,570.

This invention relates to improvements in agricultural implements and more particularly to listers,—one object of the invention being to provide simple and efficient means which shall be operable automatically to throw the planting mechanism out of or into operation when the soil-engaging members are raised or lowered.

A further object is to provide means which shall be cooperable with a lister employing front and rear frames hinged together, to automatically throw the planting mechanism out or into operation when the frame carrying the soil-engaging devices is raised or lowered relatively to the other frame.

With these and other objects in view the invention consists in certain novel features of construction and combinations of parts as hereinafter set forth and pointed out in the claims.

In the accompanying drawings:

Figure 1 is a view in side elevation of a lister embodying my improvements;

Figure 2 is an enlarged detail longitudinal section illustrating the lifting mechanism and clutch devices, and Figure 3 is an enlarged detail view showing a portion of the drive shaft for the seed mechanism and the clutch controlling said shaft viewed from the front in Fig. 2.

The lister may be of the two-row type such as illustrated in my copending application Serial No. 211,568, but for the purpose of the present application, it is not deemed necessary to show and describe herein, all the details of construction of the two-row lister.

The lister includes front and rear frames 1, 2 hinged together end to end through the medium of brackets, such as shown at 3, secured to one of said frames and having pivotal connection with the other frame. An axle 4 is mounted in suitable bearings on the rear frame 2, for the accommodation of carrying wheels 5 (one of which is shown in the drawings) and at least one of these wheels is rigidly secured to the axle so as to cause rotation of the latter during the travel of the lister.

The front frame 1 comprises plow beams 6 (one of which is shown in the drawings) and front and rear cross bars 7 and 8 respectively. The front end of the front frame may be supported on dirigible wheels 9 and the axles of the latter may be provided with arms 10 connected by links 11 with a draft member 12, the latter being pivotally connected with the cross bar 7 of the front frame, so as to be capable of swinging laterally, but these features are not claimed herein specifically, and are fully shown and described in my copending application Serial No. 211,569.

Each plow beam 6 carries at its rear end a plow base 6ª or other furrow opener device and each beam also carries a seed spout 13 and seed coverers 14.

The front frame 1 of the implement carries a toothed sector 15, the latter being provided with a comparatively long frame 16 secured at its forward end to the rear cross bar 8 of the front frame and in such manner that said frame 16 will project rearwardly and somewhat upwardly and dispose the sector over the rear frame 2. A brace 17 is connected at one end to the sector frame and at the other end to the front frame.

A lever 18 is pivoted to the sector frame and said lever is connected by a link 19, with the rear frame 2. In the present instance, in which a horse drawn lister is shown and in which the operator's seat is located at the rear portion of the rear frame 2, the lever 18 is a hand lever located within convenient reach of the operator on the seat 20, and said hand lever will be provided with a suitable detent for cooperation with the teeth of the sector. With such construction, when the lever 18 is moved down on the sector 15, the bases 6ª, the seed spouts 13 and the seed coverers 14 will be raised out of the ground, and by moving the lever upwardly, these members will be lowered into the ground.

The front frame 1, carries seeding mechanisms 21 (one of which is shown in the drawings) and the drive shaft for the feed devices is shown at 22. A sprocket wheel 23 is secured to the axle 4, and motion is transmitted from said sprocket wheel, to a sprocket wheel 24 loosely mounted on the drive shaft. The sprocket wheel 24 is provided on one face with clutch teeth so as to provide a clutch member 25 to be engaged by the teeth of a movable clutch member 26,—which latter is mounted to slide on a sleeve 27 on the shaft 22. A pin 28 passes transversely through the shaft 22 and the sleeve 27 and its respective ends enter slots 29 in the clutch member 26, so that the latter will be rotatable with the drive shaft. A disk or washer 30 on the shaft 22 provides a thrust bearing for one end of the hub of the sprocket wheel and said washer engages a pin 31 passing transversely through the shaft 22, and thus longitudinal displacement of the sprocket wheel and clutch member carried thereby in one direction is prevented, displacement of the same in the other direction being prevented by the sleeve 27. A disk or washer 32 is located on the shaft 22 in spaced relation to the clutch member 26 and is prevented from displacement by a pin 33 passing through the shaft. A spring 34 bears at one end against the disk or washer 32 and at its other end against a flange 34 of the clutch 26 and serves normally to press said clutch member into locked relation to the clutch member 25 on the sprocket wheel, so that during the normal operation of the implement, motion will be transmitted from the carrying wheel 5 and axle 4, through the sprocket gearing and clutch devices to the drive shaft 22.

One of the brackets 3 (by means of which the front and rear frames 1 and 2 are hinged together) is provided with a sleeve 35 which forms a mounting for a clutch lever 36 having at one end a crank arm 37 and provided at its other end with a yoke 38 secured thereto by a set screw 39, said yoke being positioned to embrace the clutch member 26 and engage the flange 34 thereof. The arm 37 of the clutch lever is normally disposed under one of the side bars of the rear frame 2, so that when the bases 6ª and the members associated therewith are raised, and the machine is not planting, the arm 37 of the clutch lever will engage under that side bar of frame 2 which is disposed over it, and said clutch lever will be automatically operated to disengage the clutch members and thus disengage the planting mechanism. When the front frame is lowered to bring the soil engaging members into operative positions, the arm 37 of the clutch lever will move downwardly from the side bar of the frame 2 and the spring 34 will operate to automatically close the clutch and effect operative connection of the planting mechanism through the gearing, with the axle 4 and carrying wheel 5.

Having fully described my invention what I claim as new and desire to secure by Letters-Patent, is:—

1. The combination with a lister including front and rear wheeled frames hinged together, soil-engaging means carried by the front frame, lifting mechanism carried by the front frame and operatively connected with the rear frame whereby to raise the hingedly connected ends of the two frames, seeding mechanism carried by the front frame, a driving shaft for said seeding mechanism, driving means for said shaft, a spring-pressed clutch between said shaft and its driving mechanism, and a clutch shaft having a part to engage the rear frame when the soil-engaging means are raised and thus cause operation of said clutch lever to open the clutch.

2. In a lister, the combination with front and rear wheeled frames hinged together, soil-engaging means and seeding means carried by the front frame, a drive shaft for the seeding means, a combined wheel and clutch member loose on the drive shaft, means for driving said wheel, a sleeve pinned to said drive shaft, a shiftable clutch member mounted to slide on said sleeve and rotatable therewith, a spring tending normally to press the clutch members together, a clutch lever carried by the front frame and having a yoke to engage the shiftable clutch member, said lever also having a crank arm normally below a part of the rear frame, and lifting means carried by the front frame and connected with the rear frame, said lifting means being operable to raise the front frame and soil-engaging devices relatively to the rear frame and simultaneously move the crank arm of the clutch lever against the under side of the rear frame and operate the clutch to open the same.

3. In a lister, the combination with front and rear wheeled frames hinged together, soil-engaging means carried by the front frame, and seeding mechanism including a driving shaft therefor, carried by the front frame, of a sector frame secured to the front frame and extending over the rear frame, a lever pivoted to said sector frame, a link connecting said lever with the rear frame, clutch devices on said driving shaft, said clutch devices including a clutch member loose on said shaft and a shiftable spring-pressed clutch member rotatable with said shaft, and a clutch lever cooperable with said shiftable clutch member and provided with a crank arm cooperable with the rear frame when the front frame is raised, to open the clutch devices.

In testimony whereof, I have signed this specification.

HERMAN E. ALTGELT.